No. 881,905. PATENTED MAR. 17, 1908.
F. Q. CREGIER.
ARMOR FOR PNEUMATIC TIRES.
APPLICATION FILED NOV. 30, 1906.
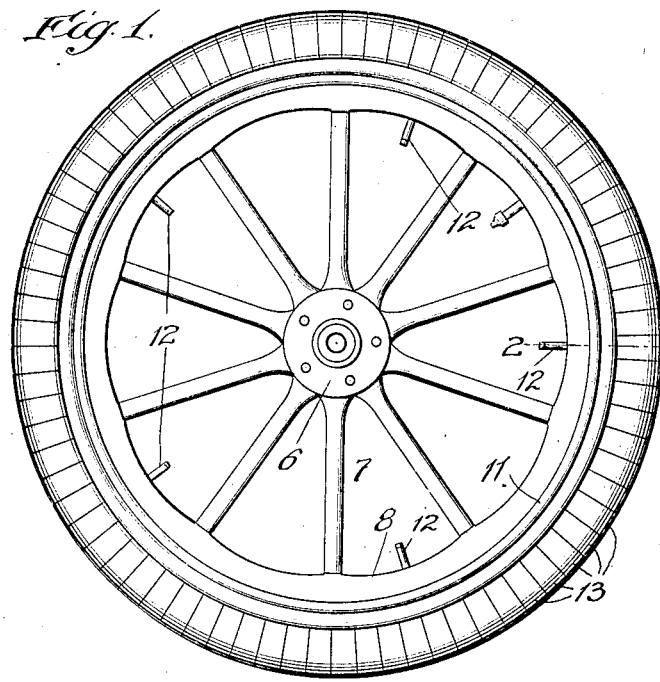
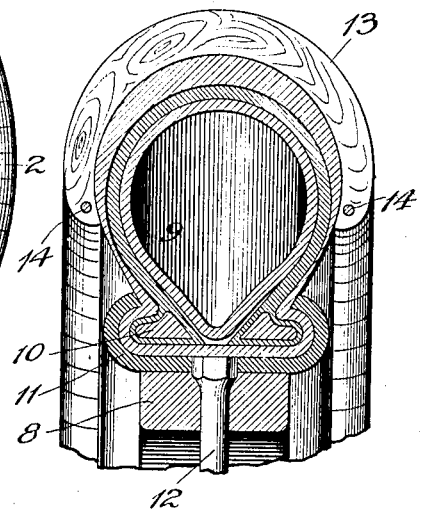
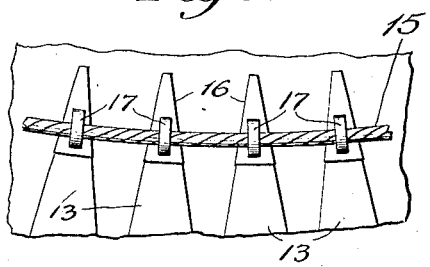
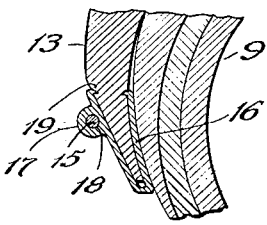
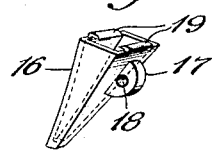
Witnesses
Ray White
E. M. Manchester
Inventor
Frederick Q. Cregier
By Jno. G. Elliott
Atty

UNITED STATES PATENT OFFICE.

FREDERICK Q. CREGIER, OF CHICAGO, ILLINOIS, ASSIGNOR OF ONE-HALF TO CHARLES H. EDGCOMB, OF CHICAGO, ILLINOIS.

ARMOR FOR PNEUMATIC TIRES.

No. 881,905.      Specification of Letters Patent.      Patented March 17, 1908.

Application filed November 30, 1906. Serial No. 345,704.

*To all whom it may concern:*

Be it known that I, FREDERICK Q. CREGIER, a citizen of the United States, and a resident of Chicago, in the county of Cook and State of Illinois, have invented certain new and useful Improvements in Armor for Pneumatic Tires, of which the following is a full, clear, and exact specification.

This invention relates to improvements in armor for pneumatic tires, and more especially for the tires of automobiles and other very heavy and powerful traction vehicles, and which before my invention so far as used with any degree of success has consisted of a leather cover for the tire having therein at intervals rivets, the outer heads of which are of greater area than are commonly employed.

The object of my invention is an armor for pneumatic tires which will entirely isolate the tire from contact with nails, glass and other sharp substances tending to cut, penetrate, injure or deface the tire and cause it to collapse or reduce its efficiency and the wearing qualities of which at the same time will promote traction without substantially or objectionably reducing the resiliency of the inflated tire.

A further object of my invention is to provide means by which an armor for pneumatic tires may be removably secured to the tire in such a manner that when the armor is injured or requires repair the injured portion may be quickly removed and replaced by a perfect piece and to have the armor of such form that it will coöperate with the fastening devices therefor to secure it upon the tire in such a manner that its accidental removal is prevented, while at the same time the flexibility and yielding of the armor to obstructions will be promoted.

With these ends in view, my invention consists in certain features of novelty in the construction, combination and arrangement of parts, by which the said objects and certain other objects hereinafter appearing are attained, all as fully described with reference to the accompanying drawings, and more particularly pointed out in the claims.

In the said drawings: Figure 1 illustrates a side elevation of a wheel for an automobile or other traction vehicle provided with a pneumatic tire and an armor embodying my invention. Fig. 2 is an enlarged transverse section through the tire, the clencher and the rim with one of the sections of the armor and a detail portion of one of the spokes shown in side elevation. Fig. 3 is a detailed side elevation of the armor in its position on the tire and particularly showing a modification in the form of the ends of the sections of the armor and the means by which they are secured to the tire. Fig. 4 a detailed transverse section through one of the armor plates shown in Fig. 3 in its operative position upon the tire and showing a means by which the ferrule thereof may be permanently secured to the armor section. Fig. 5 a perspective view of one of the ferrules.

Similar characters of reference indicate the same parts in the several figures of the drawing.

The hub 6, spokes 7 and rim 8 of the wheel shown in Fig. 1 is of the usual construction to which the pneumatic tire 9 is secured in the usual manner, which tire may be a clencher-tire secured to the rim in the usual manner, as shown, or which may be of any other form of pneumatic tire commonly employed and secured thereto by any means adapted for that purpose, and furthermore while the pneumatic tire shown is a double tube, it may also be a single tube tire for the style of the tire is immaterial for the purpose of my invention.

The clenching devices for the tires shown in the drawings are composed of the usual rings 10—10 ring 11 and bolts 12, but as before stated, such a particular structure of pneumatic tire is not essential to my invention which relates only to the armor and means by which it is secured in its operative position upon a pneumatic tire of any kind.

The essential feature of my invention, as illustrated in the drawings, is an armor composed of a number of crescent-like sections 13, or of such other form as will adapt each section to substantially maintain itself in its operative position on a tire when inflated, and which will not readily detach itself when the tire is deflated, which several sections may be further secured to the tire against any possibility of accidental detachment by a flexible connection permitting one or more of said sections to yield independently of other sections on striking an obstruction, and which will effectually prevent pointed and sharp substances from penetrating therethrough to the tire, and at the same time afford better traction than the tread of the tire itself. To these ends the armor sections 13 are preferably composed of wood steamed and bent to form, as shown in the drawing, and of such form and length as to closely embrace the periphery of the tire when inflated at points inwardly of the wheel and beyond the greatest diameter of the tire, as shown in Fig. 2.

An important advantage is gained by steaming and bending the sections to form, in that thereby the grain of the wood, as indicated in Fig. 2, is caused to extend lengthwise of each section, with the result that their strength and resistance to wear is thereby best promoted.

Each section 13, as shown in Fig. 2, is provided towards both of its free ends with perforations 14, the perforations of the one section registering with those of the other sections adjacent thereto, and providing a means by which all of the sections of a complete armor may be strung upon a flexible connection such for example as a rope, but preferably a wire cable 15.

Instead of perforating these sections the free ends of the sections may be tapered and have secured thereon ferrules 16, each of which is provided with lugs 17 having perforations 18, as shown in Figs. 3, 4 and 5 through which the cable 15 may be passed for holding the sections together and so they may yield the one independently of the other.

Ferrules may be riveted to the sections but in practice are preferably secured thereto by providing them with one or more projections 19, which may be bent into the sections as shown in Fig. 4.

The several sections preferably have their opposing side edges formed on lines radial to the axis of the wheel upon which the armor is used so that they will lie close enough together to prevent dirt and other foreign substances entering between them and yet any one or more of them be movable inwardly upon adjacent sections with sufficient freedom to prevent any substantial reduction in the resiliency of the tire at any time, and also to enable the tire to yield to obstructions and ride over them without being punctured, cut or otherwise injured. In other words there should be such a number of these sections in the armor having such freedom of movement, the one upon the other, that the resiliency of the tire will be maintained when passing over obstructions both great and small and yet that in yielding to the pressure of the sections, the tire itself will not be injured.

The several armor sections are preferably composed of wood for the reason that wood is the best material for traction purposes, that it is resilient and that when bent to form and steamed, as my invention contemplates, it is very tough and not subsequently affected by moisture tending to swell and tighten the sections against each other.

To obtain the best results both as to the resiliency and exclusion of foreign substances liable to puncture and otherwise injure the rubber tire, such for example as by pointed tacks, nails and the sharp edges of pieces of metal and glass, the sections should be loose enough to move freely upon each other to give the greatest possible resiliency to both the armor and the tire and yet tight enough to prevent such substances from passing between the sections of the armor and the tire.

So far as my invention includes a sectional armor the sections of which are composed of wood yieldingly connected together and secured to the tire against accidental detachment, my invention is not limited to the particular form of sections shown in the drawings nor to the means by which they maintain themselves or are maintained from accidental detachment therefrom.

Having described my invention, what I claim and desire to secure by Letters Patent is, 1. The combination with a pneumatic tire of an armor comprising a series of sections of bent wood conforming to the curvature of the tread of the tire and extending to a point inwardly beyond the greater diameter of the tire and clamping the tire in such a manner as to maintain them in their operative position thereon, substantially as described.

2. The combination with a tire of an armor comprising a series of bent wood sections curved to conform to the tread of the tire, the grain of which sections extends lengthwise thereof and flexible means connecting said sections and maintaining the armor against accidental displacement from the tire, substantially as described.

3. The combination with a pneumatic tire of an armor comprising a series of permanently bent wood sections, the inner faces of which conform to the curvature of the tread of the tire and a cable connecting said sections and adapted to maintain the armor against accidental detachment from the tire, substantially as described.

4. The combination with a pneumatic tire of an armor comprising a series of wood sections arranged thereon, and having uninterrupted sides adjacent each other formed on lines radial to the axis of the tire and provided with perforations or eyes, and a flexible cable passing through said eyes and thereby connecting said sections, said cable being adapted to maintain the armor against accidental detachment from the tire, substantially as described.

In witness whereof, I have hereunto set my hand and affixed my seal, this 27th day of November A. D. 1906.

FREDERICK Q. CREGIER. [L. S.]

Witnesses:
E. K. MANCHESTER,
JNO. G. ELLIOTT.